(12) United States Patent
Jung et al.

(10) Patent No.: US 12,552,976 B2
(45) Date of Patent: Feb. 17, 2026

(54) ADHESIVE COMPOSITION AND ADHESIVE SHEET USING THE SAME

(71) Applicant: DONGWOO FINE-CHEM CO., LTD., Iksan-si (KR)

(72) Inventors: Kyoungmoon Jung, Jeollanam-do (KR); Hyerim Kwon, Incheon (KR); Inoh Hwang, Hwaseong-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 559 days.

(21) Appl. No.: 18/003,978

(22) PCT Filed: Jun. 28, 2021

(86) PCT No.: PCT/KR2021/008117
§ 371 (c)(1),
(2) Date: Dec. 30, 2022

(87) PCT Pub. No.: WO2022/005139
PCT Pub. Date: Jan. 6, 2022

(65) Prior Publication Data
US 2023/0265323 A1 Aug. 24, 2023

(30) Foreign Application Priority Data

Jul. 1, 2020 (KR) .................. 10-2020-0081191

(51) Int. Cl.
| | | |
|---|---|---|
| *C08F 2/46* | (2006.01) | |
| *C08F 2/50* | (2006.01) | |
| *C08G 61/04* | (2006.01) | |
| *C09J 7/30* | (2018.01) | |
| *C09J 11/06* | (2006.01) | |
| *C09J 175/16* | (2006.01) | |

(52) U.S. Cl.
CPC .............. *C09J 175/16* (2013.01); *C09J 7/30* (2018.01); *C09J 11/06* (2013.01); *C09J 2475/00* (2013.01)

(58) Field of Classification Search
CPC ........ C09J 175/16; C09J 11/06; C09J 151/08; C09J 7/30; C09J 2475/00; C08F 290/067; C08F 220/1818; C08F 220/1811; C08F 220/1808; C08F 220/20; C08G 18/10; C08G 18/672; C08G 18/246; C08G 18/755; C08G 18/69; C08G 18/6208
USPC ................. 522/80, 1, 5, 189, 184, 71; 520/1
See application file for complete search history.

(56) References Cited

U.S. PATENT DOCUMENTS

| | | | | |
|---|---|---|---|---|
| 6,676,795 | B1 * | 1/2004 | Levandoski | C09J 175/16 101/167 |
| 2012/0270038 | A1 * | 10/2012 | Kim | C08F 290/067 525/454 |

FOREIGN PATENT DOCUMENTS

| | | |
|---|---|---|
| JP | 2002-309185 A | 10/2002 |
| JP | 2004-143233 A | 5/2004 |
| JP | 2016-199663 A | 12/2016 |
| JP | 2017-031301 A | 2/2017 |
| JP | 2018-48274 A | 3/2018 |
| KR | 10-2011-0111771 A | 10/2011 |
| KR | 10-2013-0106368 A | 9/2013 |
| KR | 10-1344590 B1 | 12/2013 |
| KR | 10-1396747 B1 | 5/2014 |
| KR | 10-2014-0148373 A | 12/2014 |
| KR | 10-2015-0106770 A | 9/2015 |
| KR | 10-2016-0014735 A | 2/2016 |
| KR | 10-1628437 B1 | 6/2016 |
| KR | 10-1775186 B1 | 9/2017 |
| KR | 10-2020-0042916 A | 4/2020 |
| KR | 10-2229884 B1 | 3/2021 |
| WO | 2015/190552 A1 | 12/2015 |

OTHER PUBLICATIONS

International Search Report for PCT/KR2021/008117 dated Oct. 12, 2021.

* cited by examiner

*Primary Examiner* — Jessica Whiteley
(74) *Attorney, Agent, or Firm* — Sughrue Mion, PLLC

(57) ABSTRACT

An adhesive composition contains a urethane oligomer, a diluent monomer and a photoinitiator, in which a weight ratio of heteroatoms in the diluent monomer is adjusted, and a dielectric constant and a dielectric tangent at 15 GHz of an adhesive layer having a thickness of 150 μm after curing are controlled to be within a specific range. The adhesive composition exhibits low dielectric properties suitable for use in an image display device requiring a high frequency band or thinned.

6 Claims, No Drawings

ADHESIVE COMPOSITION AND ADHESIVE SHEET USING THE SAME

CROSS REFERENCE TO RELATED APPLICATIONS

This is a National Stage of International Application No. PCT/KR2021/008117 filed Jun. 28, 2021, claiming priority based on Korean Patent Application No. 10-2020-0081191 filed Jul. 1, 2020, the contents of all of which are incorporated herein by reference in their entirety.

TECHNICAL FIELD

The present invention relates to an adhesive composition and an adhesive sheet using the same. Particularly, the present invention relates to an adhesive composition exhibiting low dielectric properties suitable for application to image display devices requiring high frequency bands or thinning and an adhesive sheet using the same.

BACKGROUND ART

Among adhesives, an optically clear adhesive (OCA) having high transparency is used for bonding between layers of laminated parts in an image display device. Such optically clear adhesives require high transmittance and low haze, and must satisfy physical properties such as adhesion to various substrates, heat resistance, and moisture-heat resistance durability.

In recent years, as typified by the widespread transmission of motion pictures via optical fiber communication lines and wireless communication lines, the amount of information communication handled is rapidly increasing. Accordingly, a high frequency of the image display device is required, and an antenna is mounted in the image display device to be in charge of transmitting and receiving signals in a high frequency band. In particular, in the case of an image display device applied to mobile communication, a high frequency band of 1 GHz or more, for example, 1 to 30 GHz is required. For this reason, in response to the high frequency of the image display device, it is required to use an electrical insulation material having a low dielectric constant so as to enable faster antenna transmission and reception without lowering the antenna gain value.

Meanwhile, a touch sensor is a device that recognizes a touch point in response to a user's contact with a finger or a touch pen on an image displayed on a screen, which is manufactured in a structure mounted on a flat panel display device such as a liquid crystal display (LCD), an organic light-emitting diode display (OLED), etc. As image display devices have recently become thinner, it is necessary to use an electrical insulation material having a low dielectric constant so that the touch sensor is not interfered with by the lower display panel not to affect the operation of the touch sensor.

Korean Patent Publication No. 10-2013-0106368 discloses an adhesive composition comprising an acrylic polymer compound obtained by copolymerizing monomer components including a (meth)acrylic acid ester-based monomer having a hydrocarbon group of 1 to 12 carbon atoms, a (meth)acrylic acid ester-based monomer containing a hydroxy group, a monomer containing an amide group, and a vinyl ester-based monomer and having a resin acid value of 0.1 mgKOH/g or less, a weight average molecular weight of 400,000 to 2,000,000, a Tg of −80 to 0° C., and a dielectric constant of 3 to 6, and a crosslinking agent.

However, the above adhesive composition has a problem in that it is difficult to secure sufficiently low dielectric properties to be applied to a thin image display device or an image display device using a high frequency band of 1 GHz or more.

DISCLOSURE OF INVENTION

Technical Problem

An object of the present invention is to provide an adhesive composition exhibiting low dielectric properties even in a high frequency band to enable faster antenna transmission and reception without lowering the antenna gain value.

Another object of the present invention is to provide an adhesive composition exhibiting low dielectric properties that does not affect the operation of a touch sensor even if an image display device is thinned.

Yet another object of the present invention is to provide an adhesive sheet formed using the above adhesive composition.

Technical Solution

An aspect of the present invention provides an adhesive composition comprising a urethane oligomer, a diluent monomer and a photoinitiator, wherein
a weight ratio of heteroatoms in the diluent monomer is 16.5% or less,
a dielectric constant at 15 GHz of an adhesive layer having a thickness of 150 μm after curing is less than 2.5, and a dielectric tangent at 15 GHz of the adhesive layer having a thickness of 150 μm after curing is 0.015 or less.

In an embodiment of the present invention, the urethane oligomer may have at least one backbone selected from the group consisting of polyethylene, polypropylene, polybutadiene, polyisoprene, hydrogenated polybutadiene and hydrogenated polyisoprene, and may have a radically polymerizable functional group on at least one end.

In an embodiment of the present invention, the radically polymerizable functional group may be a (meth)acryloyloxy group or a vinyl group.

In an embodiment of the present invention, the urethane oligomer may be contained in an amount of 5 to 50 parts by weight based on 100 parts by weight of the diluent monomer.

In an embodiment of the present invention, the diluent monomer may comprise at least one of a (meth)acrylic monomer or a vinyl monomer.

In an embodiment of the present invention, the photoinitiator may be contained in an amount of 0.01 to 5 parts by weight based on 100 parts by weight of the diluent monomer.

Another aspect of the present invention provides an adhesive sheet formed using the above adhesive composition.

Advantageous Effects

The adhesive composition according to the present invention can control the dielectric constant and dielectric tangent at 15 GHz of the 150 μm-thick adhesive layer after curing to specific value ranges by adjusting the weight ratio of heteroatoms in the diluent monomer, thereby exhibiting low dielectric properties suitable for application to display devices requiring a high frequency band or thinning.

Accordingly, when applied to an antenna, it enables faster antenna transmission and reception without lowering the antenna gain value, and even if the image display device is thinned, it does not affect the operation of the touch sensor.

BEST MODE

Hereinafter, the present invention will be described in detail.

One embodiment of the present invention relates to an adhesive composition comprising a urethane oligomer, a diluent monomer and a photoinitiator, wherein a weight ratio of heteroatoms in the diluent monomer is 16.5% or less, a dielectric constant at 15 GHz of an adhesive layer having a thickness of 150 μm after curing is less than 2.5, and a dielectric tangent at 15 GHz of the adhesive layer having a thickness of 150 μm after curing is 0.015 or less.

The weight ratio of heteroatoms in the diluent monomer refers to the weight ratio of heteroatoms to the total weight of atoms constituting the diluent monomer, which may be defined according to Equation 1 below.

$$\text{Weight ratio of heteroatoms (\%)} = \sum \left[ \text{ratio of monomer} \times \frac{\sum (\text{atomic weight of heteroatoms} \times \text{number of atoms})}{(\text{molecular weight of monomer})} \right] \times 100 \quad [\text{Equation 1}]$$

That is, the weight ratio of heteroatoms in the diluent monomer is a value obtained by summing the products of the weight ratio of heteroatoms contained in each monomer constituting the diluent monomer and the ratio of the corresponding monomer, expressed as a percentage.

The heteroatom refers to an element other than carbon, for example, oxygen, sulfur or nitrogen.

As described above, the weight ratio of heteroatoms in the diluent monomer is 16.5% or less, such as 0.5 to 16.5%, preferably 3 to 16.5%, more preferably 5 to 16.5%, more preferably 7 to 16.5%, more preferably 10 to 16.5%, and more preferably 10 to 16.0%.

When the weight ratio of heteroatoms in the diluent monomer is greater than 16.5%, the dielectric constant at 15 GHz of an adhesive layer having a thickness of 150 μm after curing may be 2.5 or more, or the dielectric tangent at 15 GHz of the 150 μm-thick adhesive layer after curing may be greater than 0.015. In addition, if the weight ratio of heteroatoms in the diluent monomer exceeds 16.5%, radio wave reception efficiency of an antenna may decrease and thinning of a touch sensor may be difficult.

The dielectric constant quantifies a property that affects the electric force between two point charges in a medium, which may be regarded as an amount of charge that the medium can store.

The dielectric constant at 15 GHz of the 150 μm-thick adhesive layer after curing is a value measured at a frequency of 15 GHz according to a method described in Experimental Examples, which will be described later, for a sample having an adhesive layer of a thickness of 150 μm after curing.

As described above, the dielectric constant at 15 GHz of the 150 μm-thick adhesive layer after curing may be less than 2.5, for example greater than 1 and less than 2.5. If the dielectric constant at 15 GHz of the 150 μm-thick adhesive layer after curing is 2.5 or more, the antenna gain value may be lowered when applied to an antenna using a high frequency band such as 15 GHz, and when the image display device is thinned, it may affect the operation of the touch sensor.

The dielectric tangent is a unit representing a ratio of power loss generated when an AC voltage is applied to a dielectric, and it is generally expressed as tangent delta (tangent δ).

The dielectric tangent at 15 GHz of the 150 μm-thick adhesive layer after curing is a value measured at a frequency of 15 GHz according to a method described in Experimental Examples, which will be described later, for a sample having an adhesive layer of a thickness of 150 μm after curing.

The dielectric tangent at 15 GHz of the 150 μm-thick adhesive layer after curing may be 0.015 or less, for example, greater than 0, and equal to or less than 0.015, as described above. If the dielectric tangent at 15 GHz of the 150 μm-thick adhesive layer after curing is greater than 0.015, the antenna gain value may be lowered when applied to a 5G antenna using a high frequency band such as 15 GHz, and when the image display device is thinned, it may affect the operation of the touch sensor.

In one embodiment of the present invention, the urethane oligomer may have a urethane bond in its molecule and a radically polymerizable functional group on at least one end thereof.

In order to control the weight ratio of heteroatoms, the urethane oligomer preferably has a long-chain aliphatic hydrocarbon backbone as a main chain, and it may have a structure in which a radically polymerizable functional group is bonded to at least one end of the main chain through a urethane bonding group.

Specifically, the urethane oligomer may have one or more backbones selected from the group consisting of polyethylene, polypropylene, polybutadiene, polyisoprene, hydrogenated polybutadiene and hydrogenated polyisoprene, and have a radically polymerizable functional group on at least one end thereof.

The radically polymerizable functional group may be a (meth)acryloyloxy group or a vinyl group, particularly a (meth)acryloyloxy group.

For example, the urethane oligomer may have a structure represented by Chemical Formula 1 below.

[Chemical Formula 1]

$B^1$—L—A—L—$B^2$

In the above formula,

A is polyethylene, polypropylene, polybutadiene, polyisoprene, hydrogenated polybutadiene, or hydrogenated polyisoprene;

L is a linking group containing a urethane bond;

$B^1$ is an acryloyloxy group, a methacryloyloxy group, or a $C_1$-$C_{10}$ alkoxy group, and $B^2$ is an acryloyloxy group or a methacryloyloxy group.

As used herein, the $C_1$-$C_{10}$ alkoxy group refers to a straight-chain or a branched alkoxy group having 1 to 10 carbon atoms. It may include methoxy, ethoxy, n-propanoxy, butoxy, etc., but is not limited thereto.

Preferably, the urethane oligomer may have a structure represented by Chemical Formula 2 below.

[Chemical Formula 2]

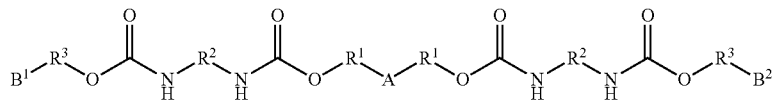

In the above formula,

A is polyethylene, polypropylene, polybutadiene, polyisoprene, hydrogenated polybutadiene, or hydrogenated polyisoprene;

$R^1$ is absent or a $C_1$-$C_{10}$ alkylene group;

$R^2$ is a $C_1$-$C_{10}$ alkylene group, a $C_3$-$C_{10}$ cycloalkylene group, or an arylene group;

$R^3$ is a $C_1$-$C_{10}$ alkylene group or a $C_3$-$C_{10}$ cycloalkylene group;

$B^1$ is an acryloyloxy group, a methacryloyloxy group, or a $C_1$-$C_{10}$ alkoxy group, and $B^2$ is an acryloyloxy group or a methacryloyloxy group.

As used herein, the $C_1$-$C_{10}$ alkylene group refers to a straight-chain or a branched hydrocarbon having 1 to 10 carbon atoms. It may include, for example, methylene, ethylene, propylene, butylene, pentylene, hexylene, etc., but is not limited thereto.

The $C_3$-$C_{10}$ cycloalkylene group used herein refers to a simple or a fused cyclic hydrocarbon having 3 to 10 carbon atoms. It may include, for example, cyclopropylene, cyclobutylene, cyclopentylene, cyclohexylene, etc., but is not limited thereto.

The arylene group used herein includes all of an aromatic group, a heteroaromatic group, and partially reduced derivatives thereof. The aromatic group is a 5- to 15-membered simple or fused ring, and the heteroaromatic group refers to an aromatic group containing one or more of oxygen, sulfur, or nitrogen. Representative examples of arylene groups include, but are not limited to, tolylene, phenylene, naphthylene, and the like.

In the $C_3$-$C_{10}$ cycloalkylene group and arylene group, one or more hydrogens may be substituted with a $C_1$-$C_6$ alkyl group, a $C_1$-$C_6$ alkoxy group, a halogen, etc.

The urethane oligomer may be prepared by a method known in the art.

For example, the urethane oligomer may be prepared by reacting a hydroxy group-containing polyolefin with a diisocyanate compound and a hydroxy group-containing (meth)acrylate compound. In addition to the hydroxy group-containing (meth)acrylate compound, a $C_1$-$C_{10}$ alcohol compound may be additionally used.

The hydroxy group-containing polyolefin may be obtained commercially or prepared and used by a method known in the art. For example, the hydroxy group-containing polyolefin may be prepared by reacting polyolefin with an epoxy compound. As the epoxy compound, ethylene oxide, propylene oxide, etc. may be used. Examples of commercially available hydroxy group-containing polyolefin include GI-1000, GI-2000, GI-3000, etc. from Nippon Soda Co., Ltd.

As the diisocyanate compound, an aliphatic diisocyanate compound and/or an aromatic diisocyanate compound may be used.

Examples of the aliphatic diisocyanate compound may include methyl diisocyanate, 1,2-ethanediyl diisocyanate, 1,3-propanediyl diisocyanate, 1,6-hexanediyl diisocyanate, 3-methyl-octane-1,8-diyl diisocyanate, 1,2-cyclopropanediyl diisocyanate, 1,3-cyclobutanediyl diisocyanate, 1,4-cyclohexanediyl diisocyanate, 1,3-cyclohexanediyl diisocyanate, isophorone diisocyanate, 4-methyl-cyclohexane-1,3-diyl diisocyanate and the like.

Examples of the aromatic diisocyanate compound may include 1,2-phenylene diisocyanate, 1,3-phenylene diisocyanate, 1,4-phenylene diisocyanate, 3-chloro-1,2-benzene diisocyanate, 4-chloro-1,2-benzene diisocyanate, 5-chloro-1,2-benzene diisocyanate, 2-chloro-1,3-benzene diisocyanate, 4-chloro-1,3-benzene diisocyanate, 5-chloro-1,3-benzene diisocyanate, 2-chloro-1,4-benzene diisocyanate, 3-chloro-1,4-benzene diisocyanate, 3-methyl-1,2-benzene diisocyanate, 4-methyl-1,2-benzene diisocyanate, 5-methyl-1,2-benzene diisocyanate, 2-methyl-1,3-benzene diisocyanate, 4-methyl-1,3-benzene diisocyanate, 5-methyl-1,3-benzene diisocyanate, 2-methyl-1,4-benzene diisocyanate, 3-methyl-1,4-benzene diisocyanate, 3-methoxy-1,2-benzene diisocyanate, 4-methoxy-1,2-benzene diisocyanate, 5-methoxy-1,2-benzene diisocyanate, 2-methoxy-1,3-benzene diisocyanate, 4-methoxy-1,3-benzene diisocyanate, 5-methoxy-1,3-benzene diisocyanate, 2-methoxy-1,4-benzene diisocyanate, 3-methoxy-1,4-benzene diisocyanate, 3,4-dimethyl-1,2-benzene diisocyanate, 4,5-dimethyl-1,3-benzene diisocyanate, 2,3-dimethyl-1,4-benzene diisocyanate, 3-chloro-4-methyl-1,2-benzene diisocyanate, 3-methyl-4-chloro-1,2-benzene diisocyanate, 3-methyl-5-chloro-1,2-benzene diisocyanate, 2-chloro-4-methyl-1,3-benzene diisocyanate, 4-chloro-5-methoxy-1,3-benzene diisocyanate, 5-chloro-2-fluoro-1,3-benzene diisocyanate, 2-chloro-3-bromo-1,4-benzene diisocyanate, 3-chloro-5-isopropoxy-1,4-benzene diisocyanate, 2,3-diisocyanate pyridine, 2,4-diisocyanate pyridine, 2,5-diisocyanate pyridine, 2,6-diisocyanate pyridine, 2,5-diisocyanate-3-methylpyridine, 2,5-diisocyanate-4-methylpyridine, 2,5-diisocyanate-6-methylpyridine, and the like.

Examples of the hydroxy group-containing (meth)acrylate compound may include hydroxymethyl (meth)acrylate, 2-hydroxyethyl (meth)acrylate, 3-hydroxy-n-propyl (meth)acrylate, 2-hydroxy-n-propyl (meth)acrylate, 2-hydroxyisopropyl (meth)acrylate, 2-hydroxy-n-butyl (meth)acrylate, 3-hydroxy-n-butyl (meth)acrylate, 5-hydroxy-n-pentyl (meth)acrylate, 2-hydroxy-n-pentyl (meth)acrylate, 3-hydroxy-n-pentyl (meth)acrylate, 4-hydroxy-n-pentyl (meth)acrylate, 2-hydroxycyclopropyl (meth)acrylate, 3-hydroxycyclopentyl (meth)acrylate, 4-hydroxycyclohexyl (meth)acrylate and the like.

Examples of the $C_1$-$C_{10}$ alcohol compound may include methanol, ethanol, n-propanol, butanol, and the like.

In addition, the urethane oligomer may be commercially obtained and used. Examples of commercially available urethane oligomer may include TEAI-1000 and TE-2000 from Nippon Soda Co., Ltd.

The urethane oligomer may have a weight average molecular weight (in terms of polystyrene) of 1,000 to 200,000 as measured by gel permeation chromatography (GPC). If the weight average molecular weight of the urethane oligomer is out of the above range, it may be difficult to secure manufacturability.

In one embodiment of the present invention, the urethane oligomer may be contained in an amount of 5 to 50 parts by weight based on 100 parts by weight of the diluent monomer. When the urethane oligomer is included in an amount of less than 5 parts by weight, the viscosity may drop, and when it is included in an amount of more than 50 parts by weight, it may be difficult for the dielectric constant and/or the dielectric tangent to satisfy the above range.

In one embodiment of the present invention, the diluent monomer serves as a dispersion medium for the urethane oligomer and is a component that can be polymerized by the action of the photoinitiator. In addition, the diluent monomer may dilute the adhesive composition to adjust the viscosity, thereby facilitating coating.

The diluent monomer may include at least one of a (meth)acrylic monomer and a vinyl monomer.

Here, (meth)acryl means acryl and/or methacryl.

The diluent monomer may be appropriately selected and used so that the weight ratio of heteroatoms is 16.5% or less.

For example, the diluent monomer may contain at least one of a (meth)acrylic monomer having an aliphatic hydrocarbon group having 10 or more carbon atoms and a vinyl ether monomer having an aliphatic hydrocarbon group having 8 or more carbon atoms in an amount of 20% by weight or more based on 100% by weight of the total monomers, for example, 20 to 99% by weight, preferably 20 to 90% by weight. When the content of at least one of the (meth)acrylic monomer having an aliphatic hydrocarbon group having 10 or more carbon atoms and the vinyl ether monomer having an aliphatic hydrocarbon group having 8 or more carbon atoms is less than 20% by weight, it may be difficult to control the weight ratio of heteroatoms to become 16.5% or less.

The aliphatic hydrocarbon group having 10 or more carbon atoms used herein refers to a straight-chain or branched-chain, saturated or unsaturated hydrocarbon group composed of 10 or more carbon atoms, for example, 10 to 100, preferably 10 to 50, more preferably 10 to 30, and may be, for example, a $C_{10}$-$C_{100}$ alkyl group, a $C_{10}$-$C_{100}$ alkenyl group, or a $C_{10}$-$C_{100}$ alkynyl group. Specifically, the aliphatic hydrocarbon group having 10 or more carbon atoms includes, but is not limited to, decyl, isodecyl, undecyl, dodecyl, tridecyl, cetyl, stearyl, isostearyl, and heptacosanyl.

The aliphatic hydrocarbon group having 8 or more carbon atoms used herein is refers to a straight-chain or branched-chain, saturated or unsaturated hydrocarbon group composed of 8 or more carbon atoms, for example 8 to 100, preferably 8 to 50, more preferably 8 to 30 and may be, for example, a $C_8$-$C_{100}$ alkyl group, a $C_8$-$C_{100}$ alkenyl group, or a $C_8$-$C_{100}$ alkynyl group. Specifically, the aliphatic hydrocarbon group having 8 or more carbon atoms includes, but is not limited to, octyl, ethylhexyl, nonyl, decyl, isodecyl, undecyl, dodecyl, tridecyl, cetyl, stearyl, isostearyl, and heptacosanyl.

The (meth)acrylic monomer having an aliphatic hydrocarbon group having 10 or more carbon atoms is a compound having an aliphatic hydrocarbon group having 10 or more carbon atoms and a (meth)acrylate group as a radically polymerizable functional group.

Specifically, as the (meth)acrylic monomer having an aliphatic hydrocarbon group having 10 or more carbon atoms, decyl (meth)acrylate, isodecyl (meth)acrylate, undecyl (meth)acrylate, dodecyl (meth)acrylate, tridecyl (meth)acrylate, cetyl (meth) acrylate, stearyl (meth) acrylate, isostearyl (meth) acrylate, 1-heptacosanyl (meth) acrylate, etc. may be used, and these may be used alone or in combination of two or more.

The vinyl ether monomer having an aliphatic hydrocarbon group having 8 or more carbon atoms is a compound having an aliphatic hydrocarbon group having 8 or more carbon atoms and a vinyl ether group as a radically polymerizable functional group.

Specifically, as the vinyl ether monomer having an aliphatic hydrocarbon group having 8 or more carbon atoms, 2-ethylhexyl vinyl ether, dodecyl vinyl ether, and the like may be used, and these may be used alone or in combination of two or more.

The diluent monomer may further include a monomer having a crosslinkable functional group.

The monomer having a crosslinkable functional group may be at least one of a monomer having a hydroxy group and a monomer having a carboxyl group.

Examples of the hydroxy group-containing monomer may include 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 2-hydroxyethylene glycol (meth)acrylate, 2-hydroxypropylene glycol (meth)acrylate, hydroxyalkylene glycol (meth)acrylate having 2-4 carbon atoms in the alkylene group, 4-hydroxybutyl vinyl ether, 5-hydroxypentyl vinyl ether, 6-hydroxyhexyl vinyl ether, 7-hydroxyheptyl vinyl ether, 8-hydroxyoctyl vinyl ether, 9-hydroxynonyl vinyl ether, 10-hydroxydecyl vinyl ether, etc., and among these, 4-hydroxybutyl acrylate, 2-hydroxyethyl (meth)acrylate, 4-hydroxybutyl vinyl ether, etc. are preferable.

Examples of the monomer having a carboxyl group may include monoacids such as (meth)acrylic acid, crotonic acid, and 2-carboxyethyl acrylate; diacids such as maleic acid, itaconic acid and fumaric acid and monoalkyl esters thereof; 3-(meth)acryloylpropionic acid; succinic anhydride ring-opening adducts of 2-hydroxyalkyl (meth)acrylates having 2-3 carbon atoms in the alkyl group; succinic anhydride ring-opening adducts of hydroxyalkylene glycol (meth)acrylates having 2 to 4 carbon atoms in the alkylene group; and compounds obtained by ring-opening addition of succinic anhydride to the caprolactone adduct of 2-hydroxyalkyl (meth)acrylate having 2-3 carbon atoms in the alkyl group, and among these, (meth)acrylic acid and 2-carboxyethyl acrylate etc. are preferred.

The monomer having the crosslinkable functional group is preferably contained in an amount of 0.5 to 20% by weight, preferably 0.5 to 10% by weight, based on 100% by weight of the total monomers. When the content of the monomer having a crosslinkable functional group is less than 0.5% by weight, the cohesive force of the adhesive is reduced and thus durability may be deteriorated, and when it is greater than 20% by weight, the dielectric constant may be increased.

The diluent monomer may further include other polymerizable monomers in addition to the above monomers.

Specific examples of the other polymerizable monomers include n-butyl (meth)acrylate, 2-butyl (meth)acrylate, t-butyl (meth)acrylate, 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, nonyl (meth)acrylate, isobornyl (meth)acrylate, and the like, and among these, 2-ethylhexyl (meth)acrylate and isobornyl (meth) acrylate are preferable. These can be used individually or in mixture of two or more.

The other polymerizable monomer may be included in an amount of 79.5% by weight or less, for example, 1 to 79.5% by weight, preferably 5 to 79.5% by weight, based on 100% by weight of the total monomers. When the content of the other polymerizable monomer is more than 79.5% by weight, it may be difficult to control the weight ratio of heteroatoms to become 16.5% or less.

In one embodiment of the present invention, the photoinitiator refers to an initiator that generates radicals by absorbing active energy rays.

Examples of the photoinitiator may include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenylketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-bis(diethylamino)benzophenone (EAB-F), dichlorobenzophenone, 2-methyl anthraquinone, 2-ethyl anthraquinone, 2-t-butyl anthraquinone, 2-amino anthraquinone, 2-methyl thioxanthone, 2-ethyl thioxanthone, 2-chloro thioxanthone, 2,4-dimethyl thioxanthone, 2,4-diethylthioxanthone (DETX), 4-isopropylthioxanthone (ITX), benzyl dimethyl ketal, acetophenone dimethyl ketal, p-dimethylamino benzoic acid ester, 2,4,6-trimethylbenzoyl-diphenyl-phosphine oxide, 2-(3,4-methylenedioxyphenyl)-4,6-bis(trichloromethyl)-1,3,5-triazine, 2,2'-bis(2-chlorophenyl)-4,4',5,5'-tetraphenylbiimidazole (HABI-101), 2,2'-bis(2-methoxyphenyl)-4,4',5,5'-tetraphenylbiimidazole (HABI-107), 2,2',4-tris(2-chlorophenyl)-5-(3,4-dimethoxyphenyl)-4',5'-diphenylbiimidazole (TCDM); and the like. These can be used individually or in mixture of two or more.

The photoinitiator may be contained in an amount of 0.01 to 5 parts by weight based on 100 parts by weight of the diluent monomer. If it is less than 0.01 parts by weight, photocuring may not proceed sufficiently, making it difficult to realize mechanical properties or adhesion of the finally obtained adhesive sheet. If it is more than 5 parts by weight, discoloration or the like may occur due to the remaining initiator, which may reduce durability.

In addition to the components described above, the adhesive composition according to an embodiment of the present invention may further include additives such as silane coupling agents, tackifying resins, antioxidants, corrosion inhibitors, leveling agents, surface lubricants, dyes, pigments, antifoaming agents, fillers, light stabilizers, antistatic agents, etc. to adjust the adhesive force, cohesive force, viscosity, modulus of elasticity, glass transition temperature, antistatic property, etc. required according to the use.

One embodiment of the present invention relates to an adhesive sheet formed using the adhesive composition.

The adhesive sheet may have an adhesive layer formed from the adhesive composition according to the present invention on a base film, or an adhesive layer formed from the adhesive composition according to the present invention interposed between two base films.

The base film may be a polyolefin-based film, a polyester-based film, an acrylic film, a styrene-based film, an amide-based film, a polyvinyl chloride film, a polyvinylidene chloride film, a polycarbonate film, and the like, which may be appropriately release-treated with silicon-based, fluorine-based, silica powder and the like.

It is preferable that the thickness of the base film is 30 to 80 μm. When the thickness is less than 30 μm, the base film is vulnerable to poor stamping, and when the thickness exceeds 80 μm, handling properties may be deteriorated.

The adhesive layer may be formed by a method of coating the adhesive composition on one sheet of a base film. The coating method is not particularly limited as long as it is a method known in the art, and for example, bar coater, air knife, gravure, reverse roll, kiss roll, spray, blade, die coater, casting, spin coating, etc. may be used.

Specifically, it may be formed by applying the adhesive composition on a base film, irradiating with an ultraviolet ray of an irradiation amount of about 100 to 2,000 mJ/cm$^2$, preferably 200 to 1,500 mJ/cm$^2$, and photocuring it.

The thickness of the adhesive layer may be 10 to 2,000 μm, preferably 25 to 1,500 μm. If the thickness of the adhesive layer is less than 10 μm, it may be difficult to buffer shocks generated from the outside, and if it exceeds 2,000 μm, optical performance may be deteriorated due to reduced transmission.

The adhesiveness of the adhesive sheet according to an embodiment of the present invention may be improved by surface treatment of the adhesive layer before bonding.

The surface treatment method is not particularly limited, and for example, the surface of the adhesive layer may be activated by a method such as corona discharge treatment, plasma treatment, ultraviolet irradiation, electron beam irradiation, or application of an anchoring agent.

The adhesive sheet according to an embodiment of the present invention may be applied not only to conventional flat panel displays and flexible displays, but also to foldable displays. In particular, the adhesive sheet according to an embodiment of the present invention can be effectively applied to interlayer adhesion for laminating parts in a display device using a high frequency band or thinned. Specifically, the adhesive sheet may be applied to bonding of various display materials such as antennas, display panels, polarizers, touch sensors, cover windows, bezels, polymer films, and FPCBs, and may be particularly applied to bonding of antennas or touch sensors.

Hereinafter, the present invention will be described in more detail by way of Examples, Comparative Examples and Experimental Examples. These Examples, Comparative Examples, and Experimental Examples are only for illustrating the present invention, and it is apparent to those skilled in the art that the scope of the present invention is not limited thereto.

Production Example 1: Preparation of Urethane Oligomer

Urethane oligomer having a weight average molecular weight of 100,000 was prepared by reacting 9 parts by weight of 2-hydroxyethyl acrylate with the isocyanate polymer obtained by reacting 80 parts by weight of hydrogenated polybutadiene polyol (EPOL, Idemitsu Kosan) with 500 ppm of dibutyl tin dilaurate catalyst (DBTDL) and 10 parts by weight of isophorone diisocyanate at 80° C.

Production Example 2: Preparation of Urethane Oligomer

Urethane oligomer having a weight average molecular weight of 110,000 was prepared by reacting 9 parts by weight of 2-hydroxyethyl acrylate with the isocyanate polymer obtained by reacting 80 parts by weight of polybutadiene polyol (Poly bd, Idemitsu Kosan) with 500 ppm of dibutyl tin dilaurate catalyst (DBTDL) and 10 parts by weight of isophorone diisocyanate at 80° C.

Production Example 3: Preparation of Urethane Oligomer

Urethane oligomer having a weight average molecular weight of 123,000 was prepared by reacting 9 parts by weight of 2-hydroxyethyl acrylate with the isocyanate polymer obtained by reacting 80 parts by weight of polyisoprene polyol (Poly ip, Idemitsu Kosan) with 500 ppm of dibutyl tin dilaurate catalyst (DBTDL) and 10 parts by weight of isophorone diisocyanate at 80° C.

Examples 1 to 8 and Comparative Examples 1 to 3: Preparation of Adhesive Composition and Adhesive Sheet Adhesive compositions were prepared by mixing the urethane oligomers synthesized in the above Production Examples, the diluent monomer, and the photoinitiator according to the composition shown in Table 1 below (parts by weight).

The adhesive compositions of Examples 1 to 7 and Comparative Examples 1 to 3 prepared as above were coated using a bar coater on a polyethylene terephthalate film (thickness: 75 μm) subjected to release treatment as a release film. Thereafter, adhesive sheets were prepared to have a thickness of 150 μm after curing the adhesive compositions by irradiating ultraviolet light with a light amount of 1.5 J/cm² for 10 minutes using a UV lamp.

Experimental Example 1

The dielectric constant and dielectric tangent of the adhesive sheets prepared in Examples and Comparative Examples were measured at a temperature of 25° C. and a humidity of 50% using a dielectric constant measuring device (Anritsu Co., product name: MS46522B).

More specifically, a 150 μm adhesive sheet from which the release film was removed was laminated between upper and lower COP films (Zeonor Co.) with a thickness of 40 μm and cut into a size of 30 mm in length×70 mm in width. The cut adhesive sheet was put into a probe of the measuring device to measure dielectric constant (Dk) and dielectric tangent (DO values at 15 GHz.

The results are shown in Table 2 below.

TABLE 1

| | | | | Example | | | | | | | | Comparative Example | | |
|---|---|---|---|---|---|---|---|---|---|---|---|---|---|---|
| | | | | 1 | 2 | 3 | 4 | 5 | 6 | 7 | 8 | 1 | 2 | 3 |
| Urethane oligomer | Production Example 1 | | | 20 | 20 | 20 | 20 | | | 10 | 20 | 20 | 20 | 20 |
| | Production Example 2 | | | | | | | 20 | | | | | | |
| | Production Example 3 | | | | | | | | 20 | | | | | |
| Diluent monomer | IBOA | $C_{13}H_{20}O_2$ | 208.1 | 30 | | | | | | | 30 | 40 | 30 | |
| | IBOMA | $C_{14}H_{22}O_2$ | 222.1 | | 30 | | | | | | | | | |
| | 2-EHA | $C_{11}H_{20}O_2$ | 184.1 | 20 | 47 | 55 | 20 | 55 | 55 | 55 | 20 | 50 | | |
| | 2-EHVE | $C_{10}H_{20}O$ | 156.1 | | | | 57 | | | | | | | |
| | i-SA | $C_{21}H_{40}O_2$ | 324.5 | 40 | 20 | 40 | 20 | 40 | 40 | 40 | | | | |
| | 1-HCA | $C_{30}H_{58}O_2$ | 450.8 | | | | | | | | 40 | | | |
| | BA | $C_7H_{12}O_2$ | 128.0 | | | | | | | | | | 68 | 98 |
| | 2-HEA | $C_5H_8O_3$ | 116.0 | 10 | | | | | | | 10 | 10 | | |
| | 4-HBA | $C_7H_{12}O_3$ | 144.0 | | | 5 | 3 | 5 | 5 | 5 | | | | |
| | AA | $C_3H_4O_2$ | 72.0 | | 3 | | | | | | | | 2 | 2 |
| | Heteroatom weight ratio (%) | | | 16.0 | 15.7 | 15.0 | 12.2 | 15.0 | 15.0 | 15.0 | 15.1 | 19.0 | 22.7 | 25.4 |
| Photoinitiator | | | | 0.7 | 0.7 | 0.7 | 0.7 | 0.7 | 0.7 | 0.7 | 0.7 | 0.7 | 0.7 | 0.7 |

IBOA: isobornyl acrylate

IBOMA: isobornyl methacrylate

2-EHA: 2-ethylhexyl acrylate

2-EHVE: 2-ethylhexyl vinyl ether i-SA: isostearyl acrylate

1-HCA: 1-heptacosanyl acrylate

BA: butyl acrylate

2-HEA: 2-hydroxyethyl acrylate

4-HBA: 4-hydroxybutyl acrylate

AA: acrylic acid

Photoinitiator: 1-hydroxycyclohexyl phenyl ketone

TABLE 2

| | Example | | | | | | | | Comparative Example | | |
|---|---|---|---|---|---|---|---|---|---|---|---|
| | 1 | 2 | 3 | 4 | 5 | 6 | 7 | 8 | 1 | 2 | 3 |
| Dielectric constant | 2.45 | 2.41 | 2.36 | 2.23 | 2.22 | 2.24 | 2.30 | 2.34 | 2.48 | 2.51 | 2.54 |
| Dielectric tangent | 0.013 | 0.011 | 0.010 | 0.002 | 0.004 | 0.003 | 0.008 | 0.011 | 0.024 | 0.026 | 0.029 |

As can be seen in Table 2, the adhesive sheets of Examples 1 to 7 in which the weight ratio of heteroatoms in the diluent monomer was 16.5% or less had dielectric constants of less than 2.5 and dielectric tangents of 0.015 or less even in a high frequency band of 15 GHz, which confirms that they exhibit excellent low dielectric properties. Accordingly, when the adhesive sheets of Examples 1 to 7 are applied to an antenna using a high frequency band, the antenna gain value is not lowered, enabling faster antenna transmission and reception, and even when the image display device is thinned, it does not affect the operation of the touch sensor.

On the other hand, the adhesive sheets of Comparative Examples 1 to 3 in which the weight ratio of heteroatoms in the diluent monomer was more than 16.5% had dielectric constants of 2.5 or more or dielectric tangents of more than 0.015 in a high frequency band of 15 GHz. Accordingly, when applied to an antenna using a high frequency band, the antenna gain value would be lowered, or when the image display device is thinned, the operation of the touch sensor would be affected.

The preferred embodiments of the present invention have been described with reference to the drawings. However, the present invention is not limited to the above-described embodiments, and it will be understood that the present invention can be implemented in a modified form without departing from the essential characteristics of the present invention.

Therefore, the scope of the present invention is defined by the claims rather than the foregoing description, and all differences within the equivalent range should be interpreted as being included in the present invention.

The invention claimed is:

1. An adhesive composition comprising a urethane oligomer, a diluent monomer and a photoinitiator, wherein
   the urethane oligomer has a backbone selected from the group consisting of polyethylene, polypropylene, polybutadiene, polyisoprene, hydrogenated polybutadiene, hydrogenated polyisoprene, and combinations thereof, and has a radically polymerizable functional group on at least one end,
   the urethane oligomer is contained in an amount of 5 to 50 parts by weight based on 100 parts by weight of the diluent monomer,
   the diluent monomer contains a (meth)acrylic monomer having an aliphatic hydrocarbon group having 10 or more carbon atoms in an amount of 20 to 40% by weight based on 100% by weight of the total monomers,
   a weight ratio of heteroatoms in the diluent monomer is 12.2 to 16.0%,
   a dielectric constant at 15 GHz of an adhesive layer having a thickness of 150 µm after curing is less than 2.5, and
   a dielectric tangent at 15 GHz of the adhesive layer having a thickness of 150 µm after curing is 0.015 or less.

2. The adhesive composition according to claim 1, wherein the radically polymerizable functional group is a (meth)acryloyloxy group or a vinyl group.

3. The adhesive composition according to claim 1, wherein the photoinitiator is contained in an amount of 0.01 to 5 parts by weight based on 100 parts by weight of the diluent monomer.

4. An adhesive sheet formed using the adhesive composition according to claim 1.

5. An adhesive sheet formed using the adhesive composition according to claim 2.

6. An adhesive sheet formed using the adhesive composition according to claim 3.

* * * * *